US010015672B2

(12) United States Patent
Berggren et al.

(10) Patent No.: US 10,015,672 B2
(45) Date of Patent: Jul. 3, 2018

(54) MOBILE HOTSPOT

(71) Applicant: SONY MOBILE COMMUNICATIONS INC., Tokyo (JP)

(72) Inventors: Anders Berggren, Lund (SE); Rickard Ljung, Helsingborg (SE); Lars Nord, Lund (SE); Linh Trang, Aakarp (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 15/088,170

(22) Filed: Apr. 1, 2016

(65) Prior Publication Data

US 2017/0034860 A1    Feb. 2, 2017

Related U.S. Application Data

(63) Continuation of application No. PCT/EP2015/067590, filed on Jul. 30, 2015.

(51) Int. Cl.
| | |
|---|---|
| *H04M 1/66* | (2006.01) |
| *H04W 12/06* | (2009.01) |
| *H04W 76/10* | (2018.01) |
| *H04W 24/02* | (2009.01) |
| *H04W 40/04* | (2009.01) |
| *H04W 60/00* | (2009.01) |
| *H04W 48/00* | (2009.01) |
| *H04W 88/16* | (2009.01) |
| *H04W 76/12* | (2018.01) |
| *H04W 88/02* | (2009.01) |

(Continued)

(52) U.S. Cl.
CPC .......... *H04W 12/06* (2013.01); *H04W 24/02* (2013.01); *H04W 40/04* (2013.01); *H04W 48/00* (2013.01); *H04W 60/00* (2013.01); *H04W 76/10* (2018.02); *H04W 76/12* (2018.02); *H04W 88/16* (2013.01); *H04W 76/15* (2018.02); *H04W 88/02* (2013.01); *H04W 88/08* (2013.01)

(58) Field of Classification Search
CPC ..................................................... H04W 12/06
USPC ......................................................... 455/411
See application file for complete search history.

(56) References Cited

U.S. PATENT DOCUMENTS 5,862,488 A * 1/1999 Kotzin .............. H04M 1/72522
455/510
9,648,633 B2 * 5/2017 Belghoul .......... H04W 72/1215
(Continued)

OTHER PUBLICATIONS

3rd Generation Partnership Project; Technical Specification Group Services and System Aspects; General Packet Radio Service (GPRS) Enhancements for Evolved Universal Terrestrial Radio Access Network (E-UTRAN) Access; Release 13, Mar. 2015.
(Continued)

*Primary Examiner* — Joel Ajayi
(74) *Attorney, Agent, or Firm* — Renner Otto Boisselle and Sklar

(57) ABSTRACT

An access point node comprises a first interface configured to communicate with a radio access node of a cellular network via a radio link and further comprises a second interface configured to communicate with a terminal via a further radio link. The access point node is configured to establish an end-to-end connection with a user-plane gateway node of the cellular network in response to receiving an attach message from the terminal.

22 Claims, 10 Drawing Sheets

(51) Int. Cl.
 *H04W 88/08* (2009.01)
 *H04W 76/15* (2018.01)

(56) References Cited

U.S. PATENT DOCUMENTS

| | | | |
|---|---|---|---|
| 2008/0117884 A1* | 5/2008 | Ishii | H04W 12/06 370/338 |
| 2011/0145319 A1 | 6/2011 | Dolan et al. | |
| 2013/0155959 A1 | 6/2013 | Ikeda et al. | |
| 2013/0288644 A1* | 10/2013 | Schroeder | H04W 12/06 455/411 |
| 2014/0003357 A1* | 1/2014 | Ejzak | H04W 76/022 370/329 |
| 2014/0376559 A1 | 12/2014 | Diwane et al. | |

OTHER PUBLICATIONS

3$^{rd}$ Generation Partnership Project: Technical Specification Group Radio Access Network; Evolved Universal Terrestrial Radio Access (E-UTRA); Relay Architectures for E-UTRA (LTE-Advanced); Release 9, Jun. 2010.

Sony et al., "V2X Use Case: V2P Enhanced Tethering", vol. SA WG1, No. Cabo:20150413-20150417, Apr. 2015.

\* cited by examiner

MOBILE HOTSPOT

This application is a Continuation of International Application No. PCT/EP2015/067590 filed on Jul. 30, 2015 and herein incorporated by reference in its entirety.

TECHNICAL FIELD

Various embodiments relate to an access point node, a user-plane gateway node, a control node of a core of a cellular network, and a method. In particular, various embodiments relate to techniques of establishing an end-to-end connection with the user-plane gateway node.

BACKGROUND

In the field of mobile communications, it is known to provide broadband connectivity to users via mobile hotspots. The mobile hotspot comprises a first interface configured to communicate with a radio access node of a cellular network via a radio link; the mobile hotspot further comprises a second interface configured to communicate with a terminal of the user via a further radio link. Here, if compared to a relaying scenario for range extension, the first interface operates according to a different radio access technology than the second interface. This typically requires that the mobile hotspot offers functionality beyond mere forwarding of traffic and/or resource allocation. Examples of mobile hotspots include cellular network modems built into vehicles, tethering hotspots, and other mobile routers.

However, functionality of such mobile hotspots is often limited to the broadband connectivity.

SUMMARY

Therefore, a need exists for providing mobile hotspots that enable advanced functionality beyond broadband connectivity.

This need is met by the features of the independent claims. The dependent claims define embodiments.

According to an aspect, an access point node is provided. The access point node comprises a first interface configured to communicate with a radio access node of a cellular network via a radio link. The access point node further comprises a second interface configured to communicate with a terminal via a further radio link. The access point node further comprises at least one processor configured to receive, via the second interface from the terminal, an attach message. The at least one processor is further configured to establish an end-to-end connection with a user-plane gateway node of a core of the cellular network via the first interface, in response to receiving the attach message from the terminal.

According to an aspect, a method is provided. The method comprises receiving, via a further radio link from a terminal, an attach message. The method further comprises, in response to said receiving of the attach message: establishing, via a radio link, an end-to-end connection with a user-plane gateway node of a core of a cellular network.

According to an aspect, a user-plane gateway node of a core of a cellular network is provided. The user-plane gateway node comprises an interface and at least one processor configured to establish, via the interface with an access point node attached to the cellular network via a radio link, an end-to-end connection. The end-to-end connection is identified by an IP address of the access point node. The at least one processor is further configured to receive, a policy and charging control message including a subscriber identifier and an identifier of the end-to-end connection. The subscriber identifier identifies a subscriber of the cellular network associated with the terminal connected to the access point node via a further radio link.

According to an aspect, a method is provided. The method comprises establishing, with an access point node attached to a cellular network via a radio link, an end-to-end connection. The end-to-end connection is identified by an IP address of the access point node. The method further comprises receiving a policy and charging control message including a subscriber identifier and an identifier of the end-to-end connection. The subscriber identifier identifies a subscriber of the cellular network associated with a terminal connected to the access point node via a further radio link.

According to an aspect, a user-plane gateway node of a core of a cellular network is provided. The user-plane gateway node comprises an interface and at least one processor. The at least one processor is configured to establish, via the interface with an access point node attached to the cellular network via a radio link, an end-to-end connection. The at least one processor is further configured to send, via the interface and as part of said establishing of the end-to-end connection, an IP address of a terminal connected to the access point node via a further radio link. The end-to-end connection is identified by the IP address of the terminal.

According to an aspect, a method is provided. The method comprises establishing, with an access point node attached to the cellular network via a radio link, an end-to-end connection. The method further comprises sending, as part of said establishing of the end-to-end connection, an IP address of a terminal connected to the access point node via a further radio link. The end-to-end connection is identified by the IP address of the terminal.

According to an aspect, a control node of a core of a cellular network is provided. The control node comprises an interface and at least one processor. The at least one processor is configured to receive, via the interface from an access point node connected to the cellular network via a radio link, an authorization request message. The authorization request message includes a subscriber identifier identifying a subscriber of the cellular network associated with a terminal connected to the access point node via a further radio link. The at least one processor is configured to check authorization of the subscriber to communicate via the radio link. The at least one processor is configured to selectively send, via the interface to the access point node, an authorization response message depending on said checking.

According to an aspect, a method is provided. The method comprises receiving, from an access point node connected to a cellular network via a radio link, an authorization request message including a subscriber identifier identifying a subscriber of the cellular network associated with a terminal connected to the access point node via a further radio link. The method further comprises checking authorization of the subscriber to communicate via the radio link. The method further comprises selectively sending, via the interface to the access point node, an authorization response message depending on said checking.

According to an aspect, a vehicle comprising an access point node is provided. The access point node comprises a first interface configured to communicate with a radio access node of a cellular network via a radio link. The access point node further comprises a second interface configured to communicate with a terminal via a further radio link. The access point node further comprises at least one processor configured to receive, via the second interface from the terminal, an attach message. The at least one processor is further configured to establish an end-to-end connection with a user-plane gateway node of a core of the cellular network via the first interface, in response to receiving the attach message from the terminal.

According to an aspect, a computer program product is provided. The computer program product comprises program code. Execution of the program code by at least one processor causes the at least one processor to execute a method comprising receiving, via a further radio link from a terminal, an attach message. The method further comprises, in response to said receiving of the attach message: establishing, via a radio link, an end-to-end connection with a user-plane gateway node of a core of a cellular network.

According to an aspect, a computer program product is provided. The computer program product comprises program code. Execution of the program code by at least one processor causes the at least one processor to execute a method comprising establishing, with an access point node attached to a cellular network via a radio link, an end-to-end connection. The end-to-end connection is identified by an IP address of the access point node. The method further comprises receiving, a policy and charging control message including a subscriber identifier and an identifier of the end-to-end connection. The subscriber identifier identifies a subscriber of the cellular network associated with a terminal connected to the access point node via a further radio link.

According to an aspect, a computer program product is provided. The computer program product comprises program code. Execution of the program code by at least one processor causes the at least one processor to execute a method comprising receiving, from an access point node connected to a cellular network via a radio link, an authorization request message including a subscriber identifier identifying a subscriber of the cellular network associated with a terminal connected to the access point node via a further radio link. The method further comprises checking authorization of the subscriber to communicate via the radio link. The method further comprises selectively sending, via the interface to the access point node, an authorization response message depending on said checking.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION OF EMBODIMENTS

Figure 1:
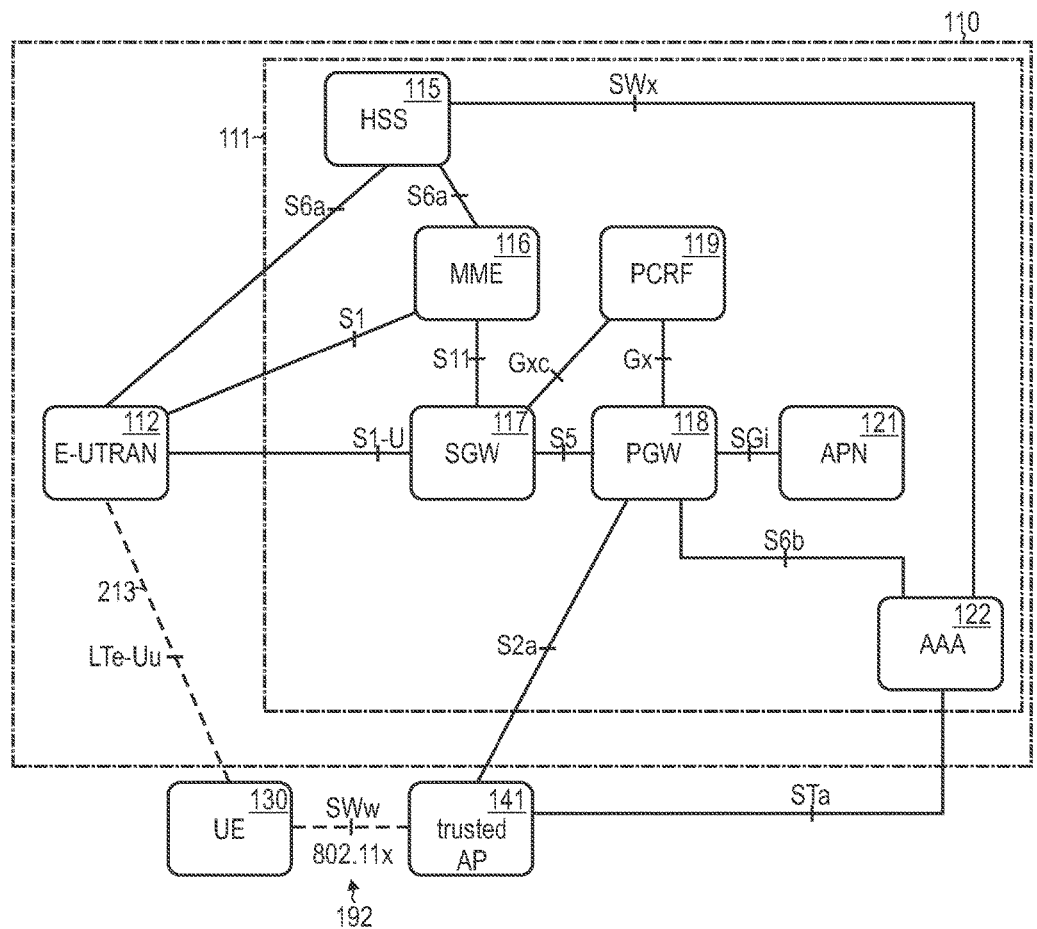
FIG. 1 schematically illustrates the prior art architecture of a cellular network enabling access of a terminal via a radio link and via a further radio link of an access point node according to reference implementations.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of establishing an end-to-end connection are discussed. The end-to-end communication terminates, at one end, at a user-plane gateway node of a core of a cellular network. Besides the user-plane gateway node, an access point node (AP) participates in the establishing of the end-to-end communication. The AP is connected via a radio link with the cellular network. At the other end, the end-to-end communication may terminate at the access point node or at a terminal (UE) connected to the access point node via a further radio link. In particular, the end-to-end connection with the user-plane gateway node is established in response to the AP receiving an attach message from the UE. The UE may or may not be directly connected to the cellular network—in addition to the connection via the AP.

The UE is connected with the AP via the further radio link. As such, the AP can be referred to as a mobile AP. Traffic to and/or from the UE may be forwarded along the end-to-end connection. Thereby, transmission of the traffic may benefit from capabilities of the mobile AP; e.g., the mobile AP may have an advanced antenna system—e.g., if compared to the UE—and thereby may provide the transmission of the traffic in a comparably reliable manner.

The end-to-end connection may be used to route and optionally encrypt traffic between end nodes of the end-to-end connection. Sometimes, the end-to-end connection is referred to as a bearer. Sometimes, in case of an encrypted traffic between the end nodes, the end-to-end connection is referred to as a tunnel or secure tunnel. Different end-to-end connections may be associated with different quality of service (QoS) requirements, including, e.g., latency, maximum bandwidth, maximum bit error rate or packet error rate, etc. The QoS requirements may be specified by a quality of service indicator.

Generally, various concepts and scenarios are conceivable for establishing the end-to-end connection. E.g., as mentioned above, it is possible that the end-to-end connection terminates at the mobile AP or the UE. It is possible that the end-to-end connection is identified by an IP address of the mobile AP or the UE; as such, it is possible that the end-to-end connection is associated with the mobile AP or the UE. E.g., during establishing of the end-to-end connection, it is possible to negotiate, link, or otherwise assign the respective IP address to the respective end-to-end connection.

It is possible to provide policy and charging functionality for the traffic on the end-to-end connection. E.g., a subscriber of the network may be associated with the UE; then it may be possible to implement subscriber-specific policy and charging enforcement for the traffic on the end-to-end connection, even though routed via the mobile AP.

It is possible that the radio link between the mobile AP and the cellular network employs a different radio access technology (RAT) then the further radio link between the UE and the mobile AP. This is different to a relaying scenario. E.g., it is possible that the radio link between the mobile AP and the cellular network employs a RAT as specified by the Third Generation Partnership Project (3GPP). At the same time, it is possible that the further radio link between the UE and the mobile AP employs a non-3GPP RAT.

Hereinafter, various scenarios will be explained in the context of the radio link between the mobile AP and the cellular network operating according to the 3GPP Long Term Evolution (LTE) RAT for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA).

Further, hereinafter, various scenarios will be explained in the context of the further radio link between the UE and the mobile AP operating according to the Wireless Local Area Network (WLAN) RAT according to the Institute of Electrical and Electronics Engineers (IEEE) 802.11 family of standards.

Turning to FIG. 1, a scenario according to reference implementations is illustrated where the UE 130 is connected via an AP 141 with a cellular network 110 according to the 3GPP LTE protocol implementing the so-called evolved packet system (EPS) architecture. An IEEE WLAN RAT is employed for the corresponding radio link 192 between the UE 130 and the AP 141. On top of the radio link 192, a 3GPP SWw reference point is implemented. The UE 130 can also communicate directly with the cellular network 110 via a radio link 213 according to the 3GPP LTE RAT. In this regard, the UE 130 is associated with a subscriber of the cellular network 110. The radio link 213 between the UE 130 and the radio access node—implemented in the scenario of FIG. 1 by the evolved UMTS Terrestrial Radio Access (E-UTRAN) technology which may be provided by an evolved node B (eNB) 112—is implemented by the LTe-Uu reference point. User-plane traffic can be forwarded in uplink (UL) and/or downlink (DL) direction on the radio links 192, 213.

In the scenario of FIG. 1, the AP 141 has a fixed-wire backbone connection with a core 111 (evolved packet core; EPC) of the cellular network 110; as such, the AP 141 is a static AP.

The eNB 112 is connected with a gateway node implemented by the serving Gateway (SGW) 117 via a reference point S1-U. The SGW 117 may route and forward the user-plane traffic acts as a mobility anchor during handovers of the UE 130.

The SGW 117 is connected via a reference point operating according to the S5 protocol to a further gateway node implemented by a Packet Data Network Gateway (PGW) 118. The PGW 118 serves as a point of exit and point of entry of the cellular network 110 for traffic towards a packet data network (PN; not shown in FIG. 1): For this purpose, the PGW is connected with an access point node 121 of the PN via a reference point operating according to the SGi protocol. The access point node 121 is uniquely identified by an Access Point Name (APN). The APN is used by the UE 130 to seek access to the PN.

The PGW 118 can be end point of an end-to-end connection for packetized user-plane traffic of the UE 130. The end-to-end connection employs the further radio link 213. The end-to-end connection may terminate, at the other end, at the UE 130. The Initial end-to-end connection is typically referred to as default EPS bearer which enables UL and DL traffic to and from the PN. The default EPS bearer is usually created when the UE 130 attaches to the cellular network 110 via the further radio link 213. One or more dedicated EPS bearers may be associated with or linked to the default EPS bearer; the one or more dedicated EPS bearers may be service-specific for one or more services for which user-plane traffic between the UE 130 and the PGW 118 occurs.

Linking a dedicated EPS bearer to the default EPS bearer may be implemented by including an indicator of the default EPS bearer when establishing the dedicated EPS bearer, e.g., in the 3GPP LTE EPS framework the Linked EPS Bearer Identity (LBI), see 3GPP TS 23.401, V13.3.0 (2015), section 5.4.1. The one or more dedicated EPS bearers in combination with the default EPS bearer may be referred to as PN connection (PDN connection). Each bearer may be associated with a given QoS; this may be achieved by a quality of service indicator, e.g., in the 3GPP LTE EPS framework by means of the quality class identifier (QCI).

The PGW 118 also serves as an end point of a further end-to-end connected for packetized user-plane traffic of the UE 130. This end-to-end connection terminates at the AP 141 and is sometimes referred to as S2a tunnel. It allows to execute transmission of data between the UE 130 and the PGW 118 via the radio link 192.

The eNB 112, the SGW 117, the PGW 118, and the access point node 121 form the user plane or data plane of the cellular network 110. Control functionality of the user-plane nodes is performed by the control plane of the cellular network 110.

Access functionalities of the UE 130 to cellular network 110 may be controlled by a control node implemented by a mobility management entity (MME) 116. The MME 116 checks authorization of a subscriber of the network 110 that is associated with the UE 130 to access the cellular network 110 via the radio link between the UE 130 and the eNB 112. The MME 116 is connected via a reference point operating according to the S1-MME protocol with the eNB 112. Further, the MME 116 is connected via a reference point operating according to the S11 protocol with the SGW 117.

Access functionality of the UE 130 to the cellular network 110 may be additionally controlled by a control node implemented by an Authentication Authorization and Accounting entity (AAA) 122. The AAA 122 checks authorization of the subscriber of the network 110 that is associated with the UE 130 to access the cellular network 110 via the radio link 192 between the UE 130 and the AP 141. The AAA 122 is connected with the AP 141 via a reference point operating according to the STa protocol.

In order to check authorization of the subscriber of the network 110 to access the network 110, the MME 116 is connected with a Home Subscriber Server (HSS) 115 via a S6a reference point; the AAA 112 is connected with the HSS 115 via a SWx reference point. Subscriber-specific data such as subscription plans etc. may be stored in a repository of the HSS 115.

Policy and charging functionality is controlled by a control node 119 implemented for example by a Policy and Charging Rules Function (PCRF) 119. The PCRF 119 is connected via a reference point operating according to the Gx protocol with the PGW 118. Policies can be enforced by the PGW 118. The PGW 118 can report charging-related information to the PCRF 119.

The architecture of FIG. 1 may be employed for so-called WLAN offloading. According to WLAN offloading, the S2a end-to-end connection is established between the AP 141 and the PGW 118. In the scenario of FIG. 1, the architecture of so-called trusted WLAN access via the AP 141 is illustrated, i.e., a scenario of trusted WLAN offload. Here, the AP 141 establishes via the S2a reference point in between the AP 141 and the PGW 118 the end-to-end secure tunnel that terminates at the AP 141 and the PGW 118, see 3GPP Technical Specifications (TS) 23.402 V13.2.0 (2015), Figure 4.2.2-1.

A further scenario includes the so-called untrusted WLAN access via the AP 141. Here, a further user-plane node implemented by an Evolved Packet Data Gateway (ePDG; not shown in FIG. 1) mediates communication in between the untrusted AP 141 and the PGW 118, see 3GPP TS 23.402, V13.2.0 (2015) section 7.

Figure 2:
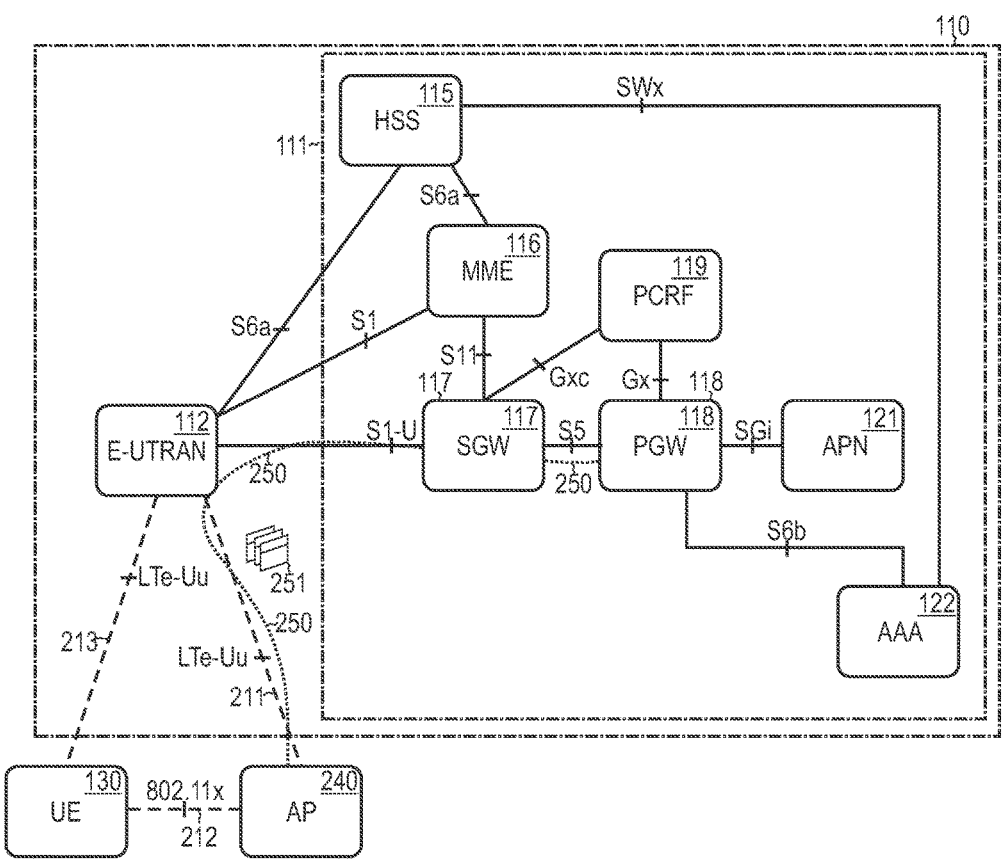
FIG. 2 schematically illustrates the architecture of a cellular network enabling access of a terminal via a radio link and via a further radio link of a mobile access point node according to various embodiments.

In FIG. 2, aspects of the network architecture of the cellular network 110 in combination with the AP 240 according to various embodiments are illustrated. In the scenario of FIG. 2, the AP 240 is connected with the eNB 112 via the radio link 211 that operates according to the 3GPP LTE RAT, i.e., implements the LTe-Uu reference point. Generally, the radio link 211 may operate according to a 3GPP RAT. The AP is a mobile hotspot and is itself associated with a subscriber of the cellular network 110. The subscriber of the AP 240 may or may not be different to the subscriber of the UE 130. The further radio link 212 between the UE 130 and the AP 240 operates according to the IEEE 802.11 WLAN RAT.

While in the scenario of FIG. 2, the further radio link 212 between the UE 130 and the AP 240 operates according to the IEEE 802.11 WLAN RAT, in other scenarios it is possible to rely on different RATs, such as Bluetooth, Near Field Communication (NFC), etc. In particular, the further radio link 212 between the UE 130 and the AP 240 may operate according to a non-3GPP RAT.

The UE 130 can connect to the cellular network 110 via the AP 240. This connection may provide advanced functionality beyond mere broadband capability to the UE 130. E.g., policy and charging functionality may be provided to the UE 130. Further, access to other PNs than the Internet may be provided via the access point node 121; e.g., access to the IP multimedia subsystem (IMS; see 3GPP TS 23.228 and 3GPP TS 23.002) may be provided to the UE 130 establishing the connection with the cellular network 110 via the AP 240.

In order to provide such advanced functionality, packetized user-plane traffic 251 that is associated with the UE 130 is routed via an end-to-end connection 250. The end-to-end connection 250 may be instead of or in addition to a further active PDN connection of the UE 130 via the eNB 112 on the direct E-UTRAN radio link 213. The end-to-end connection 250 is established in response to the UE 130 sending and attach message to the AP 240. The attach message may be part of the Extensible Authentication Protocol (EAP) in the 3GPP LTE EPS framework. The attach message may be sent in response to the UE 130 discovering the AP 240. The attach message may indicate a request of the UE 130 to establish a connection with the cellular network 110 via the AP 240.

It is then possible that the AP 240 is configured to route packetized user-plane traffic 251 via the end-to-end connection 250. The packetized user-plane traffic 251 can be between the UE 130 and the access point node 121, e.g., of the IMS or the Internet.

The end-to-end connection 250 may be UE-specific. This allows implementing policy and charging functionality. A quality of service identifier such as the QCI of the end-to-end connection 250 can be set appropriately. E.g., setting of the quality of service identifier can be negotiated between the AP 240 and the EPC 111, e.g., as part of establishing the end-to-end connection 250 E.g., the quality of service identifier may be set depending on the type of packetized user-plane traffic 251 on the end-to-end connection 250. E.g., the UE 130 may report the type of the packetized user-plane traffic 251 it intends to send and/or receive.

Generally, various concepts and scenarios are conceivable for establishing the end-to-end connection. The end-to-end connection 250 terminates at one end, in the scenario of FIG. 2, at the PGW 118; In further scenarios, it is also possible that the end-to-end connection 250 terminates at a different gateway node of the EPC 111 of the cellular network 110, e.g., at the SGW 117. In the scenario of FIG. 2, the end-to-end connection 250, at the other end, terminates at the AP 240; in other scenarios, it is also possible that, at the other end, the end-to-end connection 250 terminates at the UE 130. The end-to-end connection 250 may be implemented as bearer or as secure tunnel. Where the end-to-end connection 250 is implemented as a secure tunnel, it is possible to mimic the S2a reference point according to the trusted WLAN offloading scenario (cf. FIG. 1). E.g., corresponding control signaling may be employed for establishing the secure tunnel as the end-to-end connection 250 in such a scenario, ensuring compatibility between standards.

It is possible that the end-to-end connection 250 is implemented as a dedicated EPS bearer associated with or linked to a default EPS bearer of the AP 240, e.g., via the LBI in case of the 3GPP LTE EPS; in such a scenario, the end-to-end connection 250 may be identified by the IP address of the AP 240 and may use the subscription of the AP 240 at the network 110. The AP 240 may then forward data in between the end-to-end connection 250 and the UE 130 via the further radio link 212. Then, if one or more further UEs in addition to the UE 130 attached to the AP 240, a respective additional dedicated EPS bearer may be established to implement UE-specific end-to-end connections 250. A limitation on the number of additional dedicated EPS bearers may only be imposed by the EPS framework of the cellular network 110. Different UEs may have different dedicated EPS bearers which may have the same or different associated QoS, e.g., by indicated a quality of service identifier implemented by the QCI. For policy control and charging, it is possible that the AP 240 sends a policy and charging control message to the cellular network 110 which includes an identifier of the end-to-end connection 250 and further includes a subscriber identifier. E.g., it may be possible that the policy and charging control message is implemented by a Request Bearer Resource Modification message according to 3GPP TS 23.401 V. 13.3.0 (2015), section 5.4.5 further including the subscriber identifier. Then, a control node such as the PCRF 190 can associate the end-to-end connection 250 with the subscriber of the UE 130 in order to employ policy and charging functionality—even though the end-to-end connection 250 is identified by the IP address of the AP 240.

Generally, the subscriber identifier may uniquely identify a subscriber of the network 110. E.g., the subscriber identifier may be one of an International Mobile Subscriber Identity (IMSI) and an International Mobile Equipment Identity (IMEI).

It is also possible that the end-to-end connection 250 is implemented as a default EPS bearer of the UE 130. As such, the end-to-end connection 250 may be identified by the IP address of the UE 130. Such a scenario may mimic the S2a reference point according to the trusted WLAN offload scenario (cf. FIG. 1) and/or the untrusted WLAN offload scenario. For policy and charging, it is possible that the EPC 111—due to the identification of the end-to-end connection by the IP address of the UE 130—is informed of the respective subscriber: A dedicated policy and charging control message may not be required.

Figure 3:
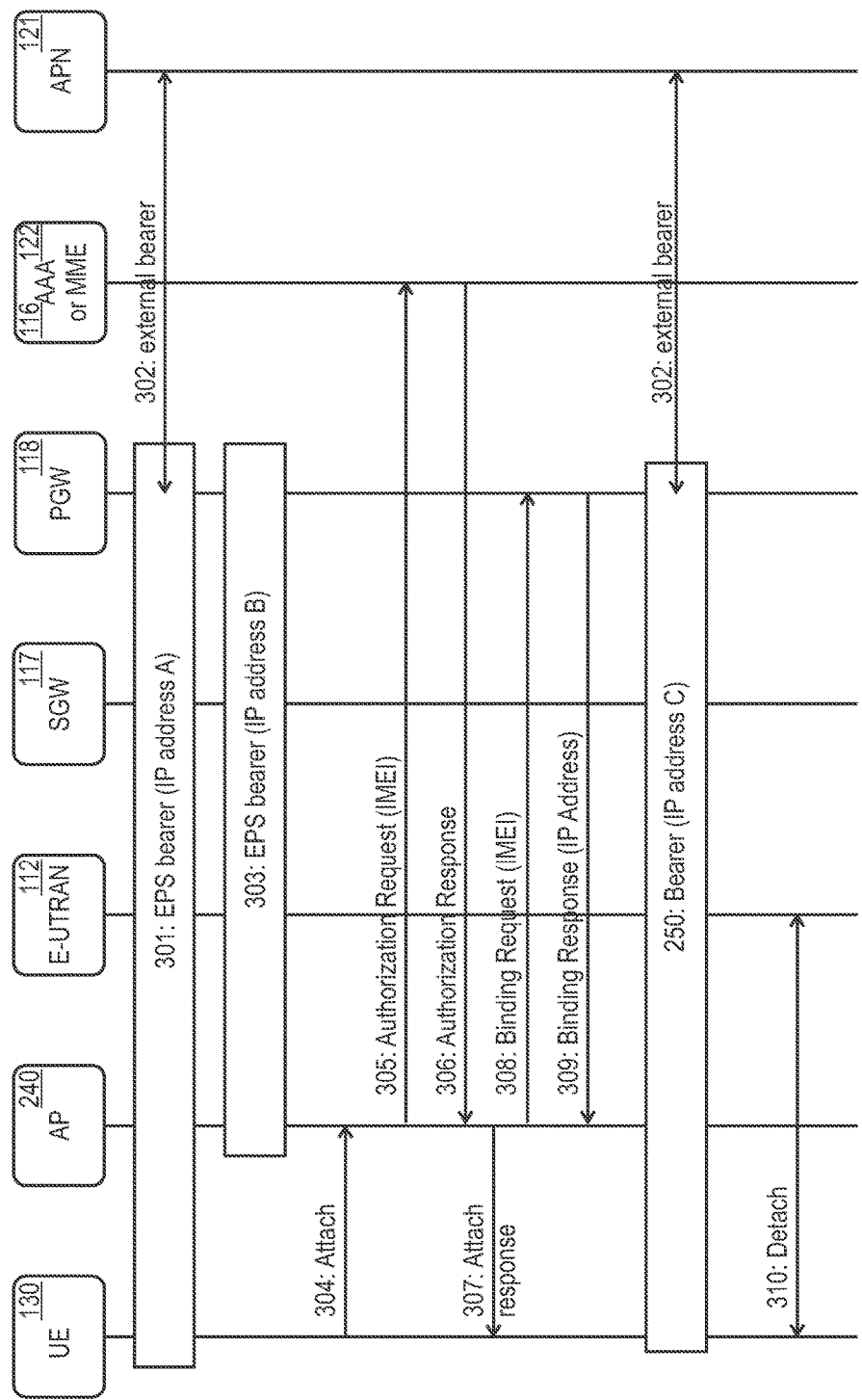
FIG. 3 is a signaling diagram of an access point node establishing an end-to-end connection between the terminal and a user-plane gateway node of a core of the cellular network, wherein the end-to-end connection is identified by an IP address of the terminal.

In FIG. 3 aspects of establishing the default end-to-end connection 250 between the UE 130 and the PGW 118 are illustrated, wherein the end-to-end connection 250 is identified by an IP address of the UE 130. FIG. 3 shows a scenario where initially, both, the UE 130 and the AP 240 are connected to the cellular network 110; in particular, the UE 130 is connected via the radio link 213 with the cellular network 110; while the AP 240 is connected via the radio link 211 with the cellular network 110. The AP 240 and the UE 130 may be connected to the same or different eNBs 112.

Thus, a PDN connection between the UE 130 and a PN is established via the PGW 118 and the access point node 121. For this, the UE 130 may be authenticated at the cellular network (not shown in FIG. 3). For this, a subscriber identifier such as the IMSI or IMEI may be provided via the radio link 213 to the MME 116, e.g., as described in 3GPP TS 23.401 V. 13.3.0 (2015), section 5.3.2. Traffic may be sent and/or received in UL and/or DL between the UE 130 and the access point node 121. The PDN connection comprises a default EPS bearer 301 that is identified by an IP address (labeled IP address A in FIG. 3) of the UE 130. The default EPS bearer 301 comprises a radio bearer on the radio link 213 between the eNB 112 and the UE 130, a S1-U bearer between the eNB 112 and the SGW 117, and further comprises an S5 bearer in between the SGW 117 and the PGW 118 (not shown in FIG. 3). The PDN connection further comprises an external bearer 302 between the PGW 118 and the APN 121. E.g., the default EPS bearer 301 of the UE 130 may be established when the UE 130 attaches to the cellular network 110. As part of the establishing of the default EPS bearer 301, the UE 130 may receive its IP address.

Further, a PDN connection between the AP 240 and the PGW 118 is established. Traffic may be transmitted in UL and/or DL between the AP 240 and the PGW 118. This PDN connection comprises a default EPS bearer 303 that is identified by an IP address of the AP 240. The default EPS bearer 303 comprises a radio bearer on the radio link 211 between the eNB 112 and the AP 240 and further comprises an S5 bearer in between the SGW 117 and the PGW 118 (not shown in FIG. 3). E.g., default EPS bearer 303 of the AP 240 may be established when the AP 240 attaches to the cellular network 110. As part of the establishing of the default EPS bearer 303, the AP 240 may receive its IP address (labeled IP address B in FIG. 3).

E.g., it is possible that the default EPS bearer 301 of the UE 130 and/or the default EPS bearer 303 of the AP 240 are established based on techniques as illustrated in 3GPP TS 23.401 V13.3.0 (2015) section 5.3.2.

Next, the UE 130 discovers the AP 240. E.g., this may be in response to the UE 130 coming into transmission range of the AP 240. In some scenarios, the UE 130 may be instructed by the EPC 111 to attach to the AP 240. Then, the UE 130 sends an attach message 304 to the AP 240 via the radio link 212. In order for the UE 130 to be able to send the attach message 304 to the AP 240, it is possible that first attach procedures according to the IEEE 802.11 RAT are executed (not shown in FIG. 3); then, the attach message 304 may be transmitted employing the IEEE WLAN RAT. The attach message 304 may include the subscriber identifier uniquely identifying a subscriber of the network 110 associated with the UE 130; in further embodiments it is possible that a dedicated control message is sent from the UE 130 via the radio link 212 to the AP 240 including the subscriber identifier. E.g., in case of the cellular network 110 operating according to the 3GPP protocols, the subscriber identifier may be one of an IMSI or IMEI.

Next, AP 240 sends an authorization request message 305 to the MME 116 or the AAA 122. The authorization request message 305 includes the subscriber identifier of the subscriber of the network 110 associated with the UE 130; additionally, it may also include the subscriber identifier of the subscriber of the network 110 associated with the AP 240.

Based on the authorization request message 305, it is then possible that the MME 116 or the AAA 122 checks authorization of the subscriber associated with the UE 130 to communicate via the radio link 211 with the HSS 115 in the cellular network 110.

Depending on the outcome of the checking of the authorization, the MME 116 or the AAA 122 may or may not send an authorization response message 306. It is possible that the authorization response message 306 indicates the outcome of the checking of the authorization. E.g., the authorization response message 306 may explicitly or implicitly indicate that the subscriber is authorized or is unauthorized to communicate with the cellular network 110 via the radio link 211 and via the AP 240. The AP 240 receives the authorization response message 306. I.e., the establishing of the end-to-end connection 250 can be selectively executed depending on the authorization response message 306.

Because the authorization response message 306 indicates granted authorization of the subscriber associated with the UE 130 to communicate via the AP 240 with the cellular network 110, an attach response message 307 is sent by the AP 240 and received by the UE 130. The attach response message 307 may indicate that the subscriber associated with the UE 130 is authorized to communicate via the radio link 211 and the AP 240.

In some scenarios it may be possible that the authorization request message 305 also includes an indicator of the access point node 121, respectively the PN to which the UE 130 seeks a connection; as such, the authorization request message 305 may include a corresponding APN. Alternatively, a default APN may be used. In some scenarios it may be possible that the authorization request message 305 also includes an indicator of a service for which the UE 130 seeks to send and/or receive traffic. The desired service and/or the desired APN may also be authorized and checked in a separate step, e.g., by the MME 116 and/or the AAA 122.

Because in the scenario of FIG. 3, the subscriber associated with the UE 130 is authorized to establish the end-to-end connection 250, a binding request message 308 including the subscriber identifier is sent by the AP 240 and received by the PGW 118. In response to the PGW 118—acting as a mobility anchor—receiving the final request message, the PGW 118 assigns an IP address to the UE 130 and includes the assigned IP address (labeled IP address C in FIG. 3) in a binding response message 309 which is subsequently received by the AP 240. Sometimes, the binding messages 308, 309 may also be referred to as create bearer messages. Here, a bearer context activation procedure may be executed by the EPC 111. It is possible that the AP 240 informs the UE 130 of the assigned IP address (not shown in FIG. 3), e.g., to inform the UE that the setup of the end-to-end connection 250 is complete. As can be seen, in the scenario of FIG. 3 the UE 130 is assigned a global IP address. In this context, the global IP address may uniquely identify the UE 130 with respect to the EPS 110, i.e., by being picked from an address pool of the EPS 110. In other scenarios, the global IP address may uniquely identify the UE 130 beyond and outside the EPS 110.

Then, the end-to-end connection 250 implemented by the default EPS bearer which is identified by the newly established IP address of the UE 130 can be established and traffic may be transmitted from and/or to the UE 130 and the access point node 121. In some scenarios, it is possible that the end-to-end connection 250 uses end-to-end encryption and therefore may be referred to as a tunnel, e.g., a Proxy Mobile IPv6 (PMIPv6) tunnel. As can be seen from FIG. 3, the default EPS bearer 303 of the AP 240 and the default EPS bearer 250 of the UE 130 can coexist and are not linked to each other; e.g., different LBIs may be used and/or different IP addresses can be associated with the default Eps bearers 303, 250. This allows, amongst other effects, to unambiguously attribute traffic on the default EPS bearer 250 to the subscriber associated with the UE 130. Traffic can be separated between the subscriber associated with the AP 240 and the subscriber associated with the UE 130. This enables to implement policy and charging functionality that is subscriber-specific of the subscriber of the UE 130. E.g., charging functionality may consider the particular access point node 121 associated with the default EPS bearer 250 such that PN-specific charging can be implemented. E.g., it can be possible to distinguish between Internet traffic as well as IMS-related traffic for each individual UE 130 offloaded to the AP 240.

Where one or more other UEs (not shown in FIG. 3) send an attach message to the AP 240, the AP 240 can be configured to establish one or more other end-to-end connections by corresponding default EPS bearers identified by the IP addresses of the one or more other UEs. Thus, the default EPS bearers 250 can be UE-specific. Here, it is possible that the one or more other UE are assigned unique IP addresses by the PGW 118. This allows to distinguish between traffic associated with the UE 130 on the one hand side, and traffic associated with the one or more other UEs on the other hand side.

Optionally, the UE 130 may then send a detach message 310 via the radio link 213 to the eNB 112 such that the original default EPS bearer 301 can be released. Traffic which has been previously handled by the default EPS bearer 301 can then be migrated or offloaded to the default EPS bearer 250. Because of this, the scenario is illustrated in FIG. 3 can also be referred to as WLAN offloading. In other scenarios, it is possible that the default EPS bearers 301, 250 co-exists.

Albeit with respect to FIG. 3 a scenario has been discussed where the end-to-end connection 250 is terminated, respectively, at the UE 130 and the PGW 118, it should be understood that in other scenarios it is also possible that the end-to-end connection 250 is terminated, respectively, at the AP 240 and the PGW 118. This may be particularly relevant where traffic on the end-to-end connection 250 is transmitted mimicking the S2a reference point.

Figure 4:
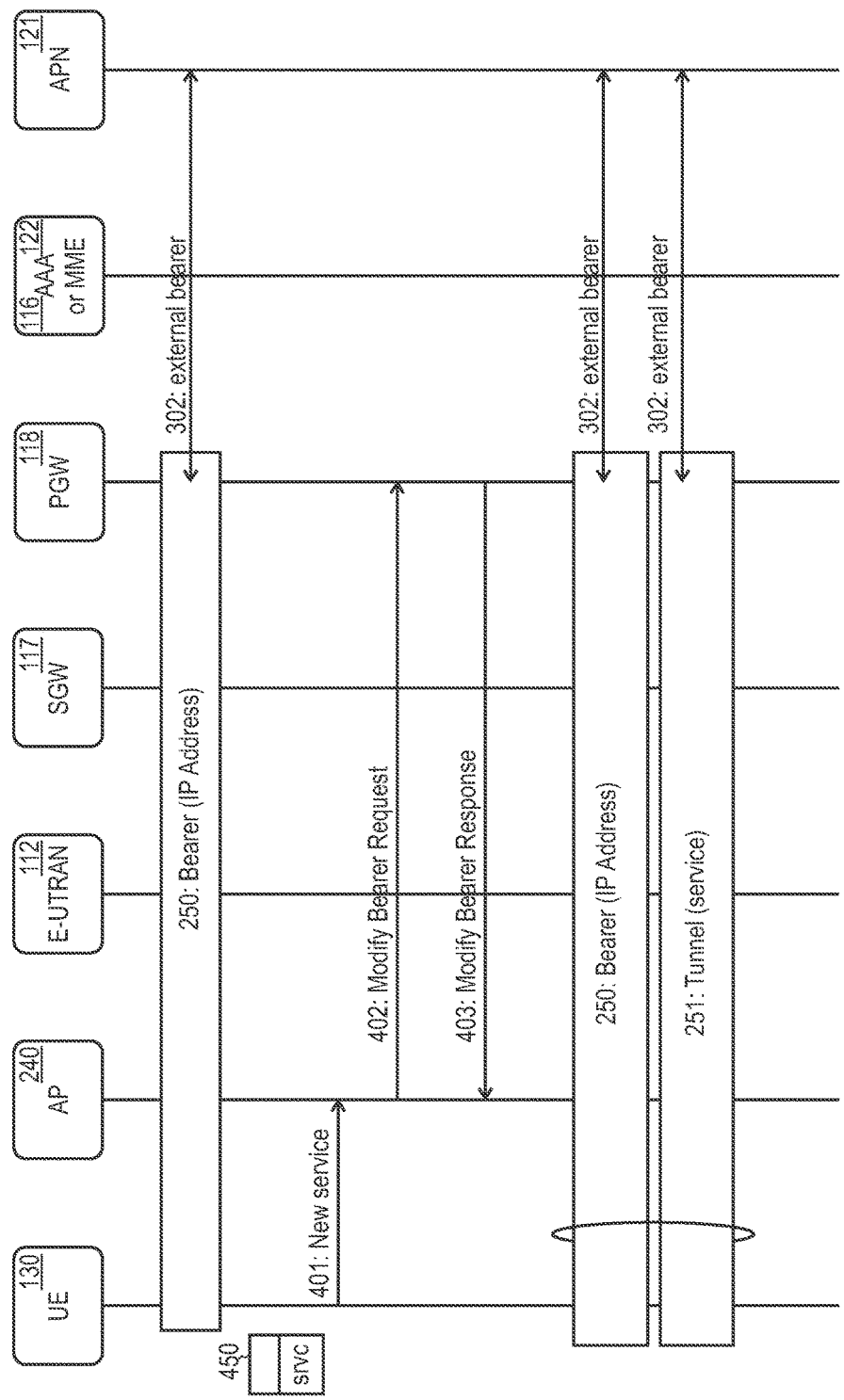
FIG. 4 is a signaling diagram in the context of FIG. 3, wherein in addition to the end-to-end connection a further end-to-end connection associated with a given service and identified by the IP address of the terminal is established, wherein the further end-to-end connection is linked to the end-to-end connection.

In FIG. 4, aspects of establishing a service-specific further end-to-end connection 251 that is associated with the UE 130 are illustrated. FIG. 4 shows a situation where the default EPS bearer 250 identified by the IP address of the UE 130 via the AP 240 has already been established (cf. FIG. 3). In such a situation, the UE 130 seeks to send and/or receive user-plane traffic associated with a given service 450. E.g., the given service may relate to a specific higher-layer application. It is also possible that the given service relates to a specific access point node 121/PN. For some reason, a dedicated EPS bearer for that given service is desired, e.g., due to particular QoS constraints or particular charging rules or the specific PN of that traffic.

In response to a need of sending traffic of the specific service 450, the UE 130 sends a control message 401 indicating the need of transmission of the user-plane traffic of the given service 251. Alternatively or additionally, it is also possible that the UE 130 receives a corresponding control message indicating the need of transmission of the user-plane traffic of the given service 251.

Next, the AP 240 establishes the further end-to-end connection, by sending a modify bearer request message 402 to the PGW 118 and receiving a modify bearer response message 403 from the PGW 118. E.g., the modify bearer request message 402 may be implemented by the Request Bearer Resource Modification message according to 3GPP TS 23.401 TS 23.401, V13.3.0 (2015). E.g., the modify bearer request message 402 may include the subscriber identifier associated with the user of the UE 130 and/or the IP address of the UE 130 and/or the LBI of the default EPS bearer 250. Then, it is possible to establish—in addition to the default EPS bearer 250—a dedicated EPS bearer 251 that is service-specific. The dedicated EPS bearer 251 is identified by the IP address of the UE 130 and is linked to the default EPS bearer 250, e.g., by the LBI. However, in other scenarios it is also possible that the service-specific end-to-end connection 251 is not linked to the default EPS bearer 250, e.g., by using a different LBI and/or a different IP address.

In the scenario of FIG. 4, the dedicated EPS bearer 251 terminates at the UE 130 and the PGW 118. In other scenarios it is possible that the dedicated EPS bearer 251 terminates at the AP 240 and, at the other end, the PGW 118 and/or the SGW 117.

Above, with respect to FIGS. 3 and 4, scenarios have been illustrated where the end-to-end connection to the PGW 118 is implemented by the default EPS bearer 250 that is identified by the IP address of the UE 130.

Figure 5:
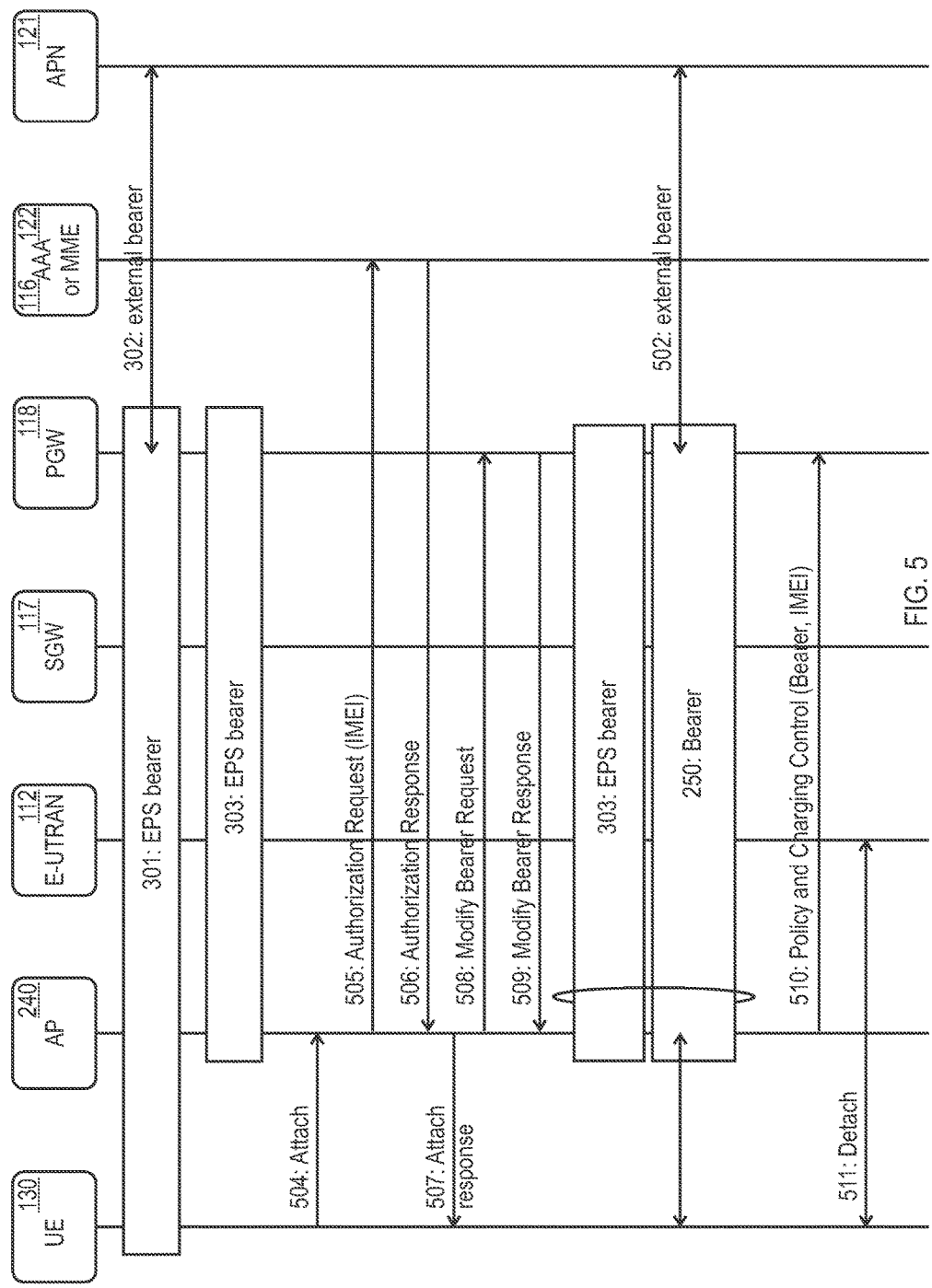
FIG. 5 is a signaling diagram of an access point node establishing an end-to-end connection between the access point node and the user-plane gateway node of a core of the cellular network, wherein the end-to-end connection is identified by an IP address of the access point node.
Figure 6:
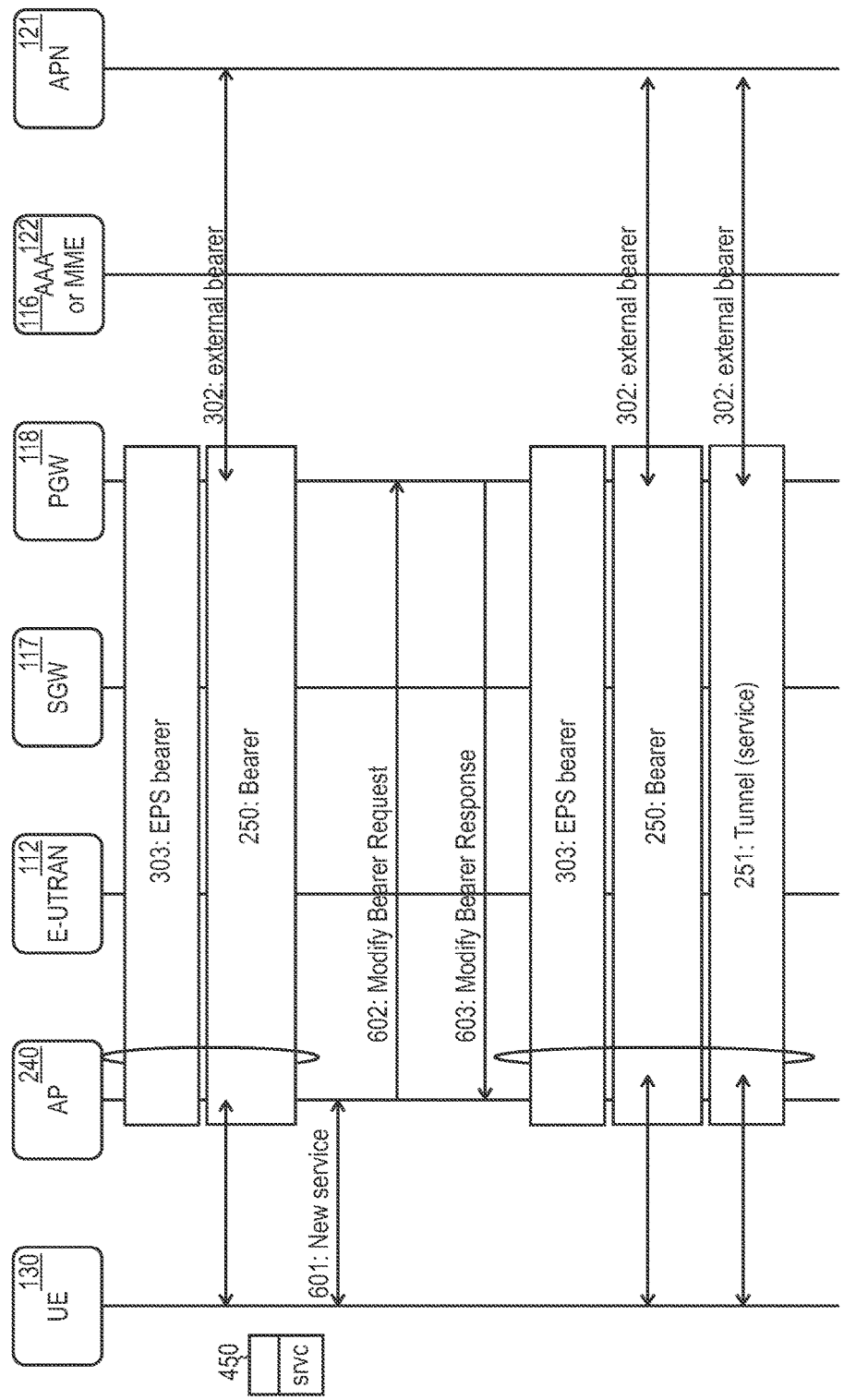
FIG. 6 is a signaling diagram in the context of FIG. 5, wherein in addition to the end-to-end connection a further end-to-end connection associated with a given service and identified by the IP address of the access point node is established, wherein the further end-to-end connection is linked to the end-to-end connection.

With respect to FIGS. 5 and 6, aspects of illustrated where the end-to-end connection to the PGW 118 is implemented by a dedicated EPS bearer 250 that is identified by the IP address of the AP 250 and that is linked to the default EPS bearer 303 of the AP 240. FIG. 5 generally corresponds to the scenario of FIG. 3, however, the end-to-end connection 250 is identified by the IP address of the AP 250—rather than by the IP address of the UE 130.

Messages 504-509 correspond to messages 304-309, wherein modify bearer messages 508, 509 are used to modify the default EPS bearer 303, instead of creating a new default EPS by means of the binding messages 308, 309.

Next, the dedicated EPS bearer 250 terminating at the AP 240 and the PGW 118 is set up and traffic between the UE 130 and the access point node 121 can be routed via the AP 240 and the radio link 211. The dedicated EPS bearer 250 is identified by the IP address of the AP 240 and is linked to the default EPS bearer 303 of the AP 240, e.g., by the LBI.

In the scenario of FIG. 5, the AP 240 may assign a local IP address to the UE 130, e.g., as part of the attach response message 507 or in a separate message. Then, the AP 240 may route user-plane traffic 251 on the dedicated EPS bearer 250 based on the local IP address of the UE 130.

Where one or more other UEs (not shown in FIG. 5) send an attach message to the AP 240, the AP 240 can be configured to establish one or more other end-to-end connections by linking further dedicated EPS bearers identified by the IP address of the AP 240 to the default EPS bearer 303. Thus, the dedicated EPS bearers 250 can be UE-specific. Here, it is possible that the one or more other UEs are assigned unique local IP addresses by the AP 240.

In order to inform the cellular network 110 about the particular subscriber associated with the UE 130 to which the traffic on the dedicated EPS bearer 250 identified by the IP address of the AP 240 belongs to, a policy and charging control message 510 is sent by the AP 240 and received by the PGW 118. The policy and charging control message 510 includes the subscriber identifier of the UE 130 and implicitly or explicitly indicates the dedicated EPS bearer 250, e.g., by means of the LBI. Based on such information the network 110 achieves knowledge on the subscriber associated with the traffic on the dedicated EPS bearer 250; this allows to implement policy and charging control functionality in a subscriber-specific manner.

The detach message 511 corresponds to the detach message 310.

In FIG. 6, aspects of establishing a service-specific further end-to-end connection 251 are illustrated. FIG. 6 generally corresponds to the scenario of FIG. 4, however, the end-to-end connection 250 is identified by the IP address of the AP 250—rather than by the IP address of the UE 130. FIG. 6 shows a situation where the default EPS bearer 250 identified by the IP address of the AP 240 has already been established (cf. FIG. 5).

601-603 generally correspond to 401-403.

Hence, in response to a need of sending traffic of the specific service 450, the UE 130 sends a control message 601 indicating the need of transmission of the user-plane traffic of the given service 251. Alternatively or additionally, it is also possible that the UE 130 receives a corresponding control message indicating the need of transmission of the user-plane traffic of the given service 251.

Further, the AP 240 establishes the further end-to-end connection 251, by sending a modify bearer request message 602 to the PGW 118 and receiving a modified bearer response message 603 from the PGW 118. E.g., the modify bearer request message 602 may include the subscriber identifier and/or the IP address of the AP 240 and/or the LBI of the dedicated EPS bearer 250 and/or the LBI of the default EPS bearer 303. Then, it is possible to establish—in addition to the dedicated EPS bearer 250—a further dedicated EPS bearer 251 that is service-specific. The dedicated EPS bearer 251 is identified by the IP address of the AP 240 and is linked to the default EPS bearer 303, e.g., by the LBI. However, in other scenarios it is also possible that the service-specific end-to-end connection 251 is not linked to the dedicated EPS bearer 250, e.g., by using a different LBI and/or a different IP address.

In the scenario of FIGS. 4 and 6, the dedicated EPS bearer 251 offers end-to-end encryption and is, therefore, implemented by a secure tunnel; in other scenarios, an encrypted transmission is possible on the dedicated EPS bearer 251.

In the scenario of FIGS. 4 and 6, both, the default EPS bearer 250 and the dedicated EPS bearer 251 route packetized user-plane traffic 251 towards one and the same access point node 121; however, in various scenarios it is possible that the default EPS bearer 250 and the dedicated EPS bearer 251 route user-plane traffic to different access point nodes.

Figure 7:
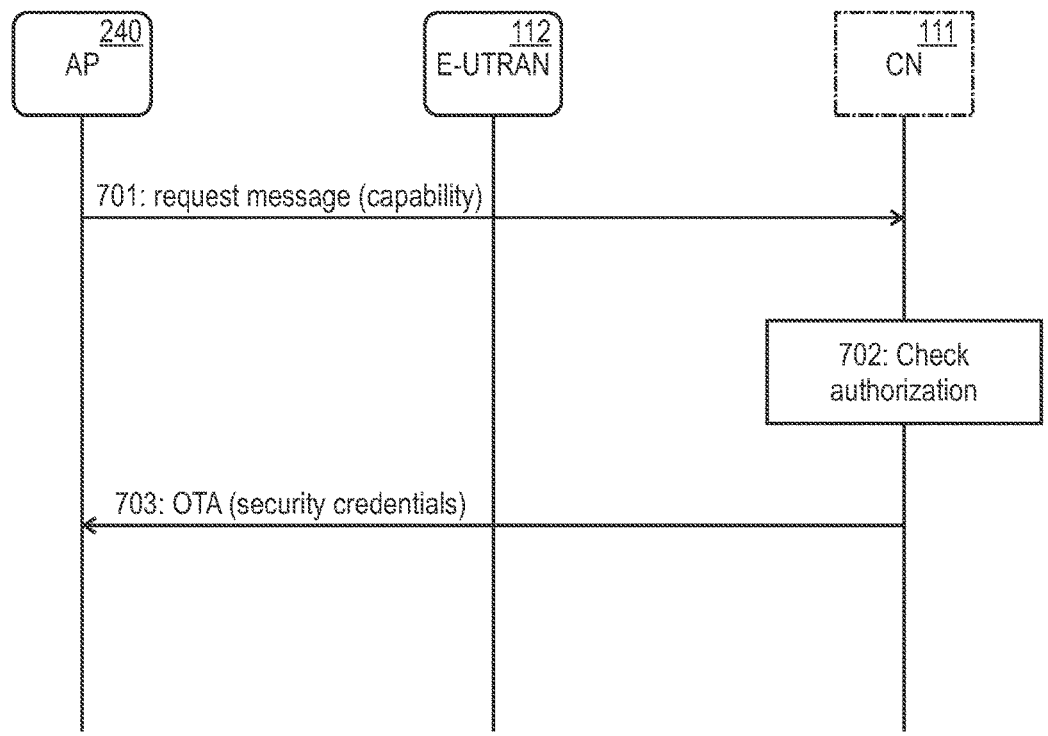
FIG. 7 is a signaling diagram illustrating negotiation of an authorization of the access point node to establish the end-to-end connection.

The Trusted AP 141 in FIG. 1 is a well-defined node that is operated by a network operator. As such a trusted node, the Trusted AP has been configured to perform special trusted tasks which may include, e.g., handling of the subscription information of the terminal 130, perform a terminal 130 authentication task, set up a bearer to the PGW 118 with corresponding policy and charging policies, and forward traffic to and from the terminal 130. The AP 240 in FIG. 2 needs to perform similar security sensitive tasks. If the AP 240 is not preconfigured with these security credentials, corresponding control parameters can be configured and provisioned by the EPC 111 over-the-air (OTA). Turning to FIG. 7, aspects of such configuring of the AP 240 and aspects of negotiating an authorization of the AP 240 to establish the end-to-end connection 250 are illustrated. A request message 701 is sent which indicates a request of the AP 240 to offer mobile hotspot functionality as illustrated herein. E.g., the request message 701 can implement a capability control information element indicating a security level of the AP 240. E.g., the security level may indicate one or more security credentials of the AP 240 such as support of end-to-end encryption, etc. E.g., the request message 701 can be sent in response to the AP 240 attaching to the cellular network 110 and/or in response to the terminal 130 attaching to the AP 240. E.g., authorization of the AP 240 to offer the mobile hotspot functionality can be checked by a control node of the EPC 111, e.g., by the MME 116, HSS 115 and/or the AAA 122, at 702. Checking of the authorization may depend, e.g., on the security level as indicated by the capability control information element in message 701. If authorization of the AP 240 to offer the mobile hotspot functionality is granted, a configuration message 703 is sent from the EPC 111 to the AP 240; e.g., the configuration message 703 can include control parameters such as security credentials needed for the establishing of the end-to-end connections 250, etc. The control parameters can include other settings, e.g., preferred Quality of Service (QoS) requirements, etc. E.g., the configuration message 703 can rely on OTA configuration procedures. The request message 701 could furthermore indicate that the AP 240 is not preconfigured with software to execute the tasks needed to perform the tasks of a trusted access point. In this case, the configuration message 703 could include runtime code compiled for the AP 240.

Instead of OTA configuration procedures as illustrated above with respect to FIG. 7, it is also possible that the AP 240 is preconfigured to always have the possibility to act as a mobile hotspot according to techniques as illustrated herein. E.g., such a pre-configuration could be associated with a specific UE class to which the AP 240 is assigned.

Figure 8:
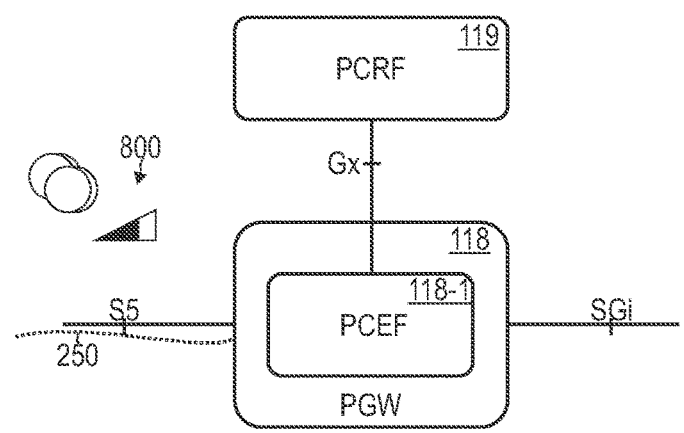
FIG. 8 illustrates policy enforcement and charging functionality of the user-plane gateway node of the core of the cellular network for traffic on the end-to-end connection.

In FIG. 8, aspects of policy enforcement and charging functionality 800 by means of the PCRF 119 and a Policy and Charging Enforcement Function (PCEF) 118-1 implemented by the PGW 118 are illustrated. As can be seen from FIG. 8, the end-to-end connection 250, be it in the form of an end-to-end connection identified by the IP address of the UE 130 or be in the form of an end-to-end connection identified by the IP address of the AP 240, terminates at the PGW 118. The PGW 118 is configured to route packetized user-plane traffic 251 to and from the terminal 130 via the end-to-end connection 250. For the traffic 251, depending on policy and charging rules provided at the PCRF 119, traffic shaping and/or charging may be executed. E.g., the PCEF 118-1 may report an amount of data of the traffic on the end-to-end connection 250 to the PCRF 119 and/or may implement traffic restrictions based on corresponding commands received from the PCRF 119. The PCEF 118-1 may implement deep packet inspection (DPI), etc.

Figure 9:
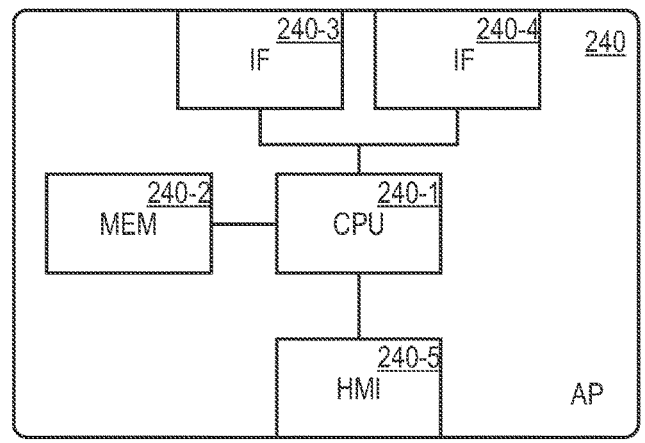
FIG. 9 schematically illustrates the access point node comprising a first interface configured to communicate with a radio access node of the cellular network via a radio link and further comprising a second interface configured to communicate with the terminal via a further radio link.

FIG. 9 is a schematic illustration of the AP 240. The AP 240 comprises a processor 240-1 which is coupled with a memory 240-2. Further, the AP 240 comprises a first interface 240-3 that is configured to communicate with the eNB 112 of the cellular network 110 via the radio link 211. The first interface 240-3 supports, both, UL and DL transmission. The AP 240 also comprises a second interface 240-4 that is configured to communicate with the UE 130 via the further radio link 212. The AP 240 further comprises a human machine interface (HMI) 240-5 which is configured to receive instructions from a user and output information to a user. The memory 240-2 may store control instructions that can be executed by the processor 240-1. E.g., when the processor 240-1 executes the control instructions, a method according to the flowchart of FIG. 12 may be executed.

Figure 12:
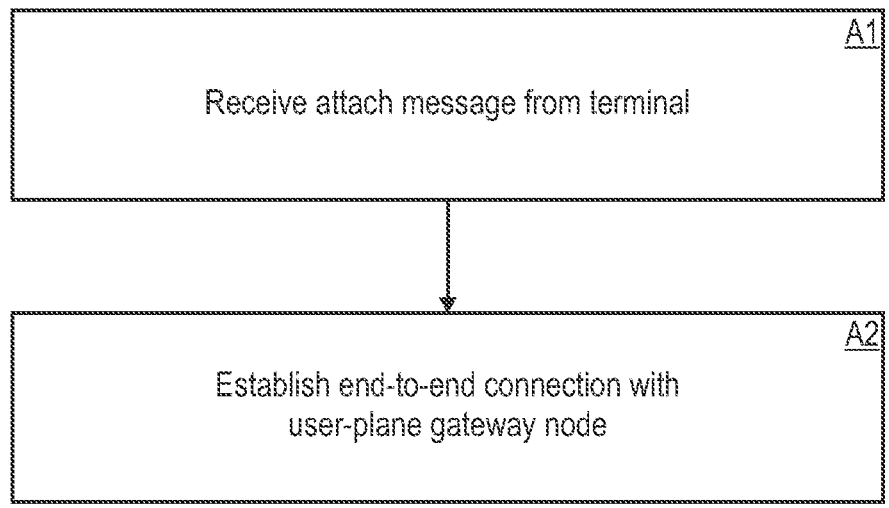
FIG. 12 is a flowchart of a method according to various embodiments, wherein the method comprises establishing the end-to-end connection with the user-plane gateway node in response to receiving an attach message from the terminal.

Referring to FIG. 12: At A1, the attach message 304, 504 is received from the UE 130 via the second interface 240-4. Then, at A2, the end-to-end connection 250 with the PGW 118 is established. A2 may include sending the authorization request message 305, 505, receiving the authorization response message 306, 506, sending the request message 308, 508, receiving the response message 309, 509, etc.

Figure 10:
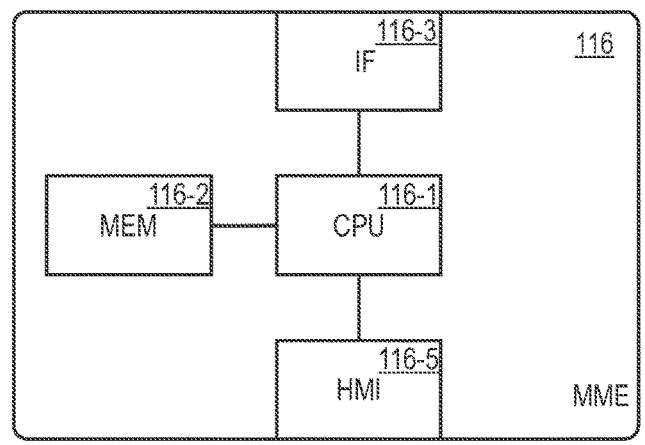
FIG. 10 schematically illustrates a control node of a core of the cellular network configured to check authorization of a subscriber of the cellular network associated with the terminal to communicate via the radio link.

FIG. 10 is a schematic illustration of the MME 116. The MME 116 comprises a processor 116-1 which is coupled with a memory 116-2. Further, the MME 116 comprises an interface 116-3 which is configured to communicate with the HSS 115 via the S6a reference node, with the eNB 112 via the S1 reference node, and with the SGW 117 via the S11 reference node. The MME 116 further comprises an HMI 116-5 which is configured to receive instructions from a user and output information to a user. The memory 116-2 may store control instructions that can be executed by the processor 116-1. E.g., when the processor 116-1 executes the control instructions, a method according to the flowchart of FIG. 13 may be executed.

Figure 13:
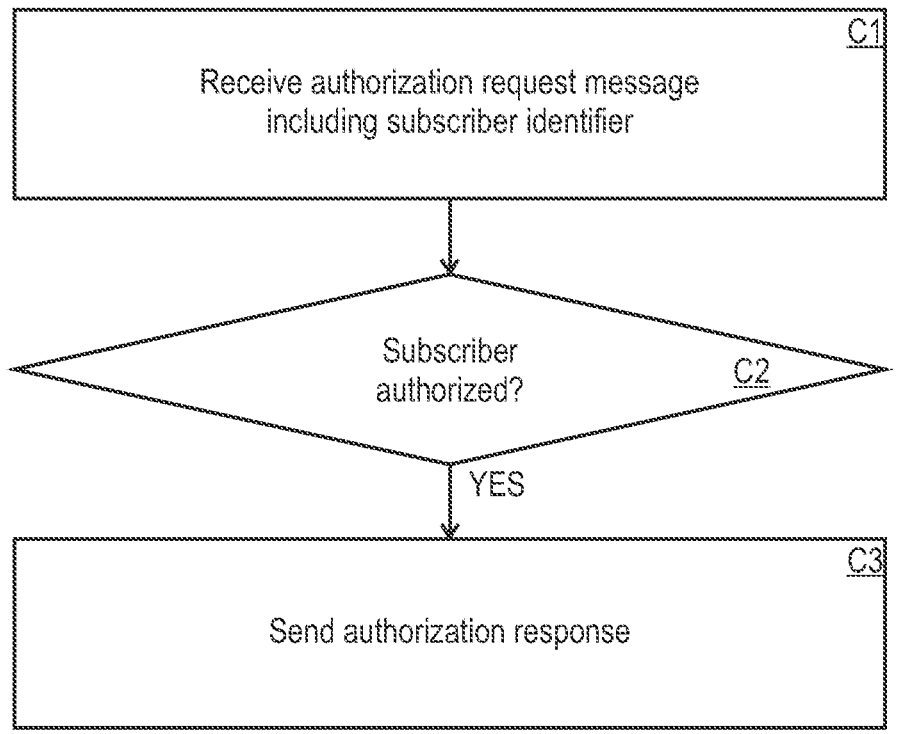
FIG. 13 is a flowchart of a method according to various embodiments, wherein the method comprises checking authorization of a subscriber to communicate via the radio link with the cellular network.

Referring to FIG. 13: First, the processor 116-1 receives, via the interface 116-3 from the AP 240, the authorization request message 305, 505 which includes the subscriber identify uniquely identifying the subscriber associated with the terminal 130, C1.

Next, the processor 116-1 checks authorization of the subscriber associated with the terminal 130 to communicate via the radio link 211, i.e., to access the cellular network 110, C2.

In case the subscriber is authorized to communicate via the radio link 211, the processor 116-1 sends, via the interface 116-3 to the AP 240, the authorization response message 306, 506, C3.

Thus, by executing C1-C3 the MME 116 contributes to establishing the end-to-end connection.

While above with respect to FIGS. 10 and 13 various techniques have been illustrated with respect to the MME 116, it should be understood the corresponding techniques may be readily applied to the AAA 122.

Figure 11:
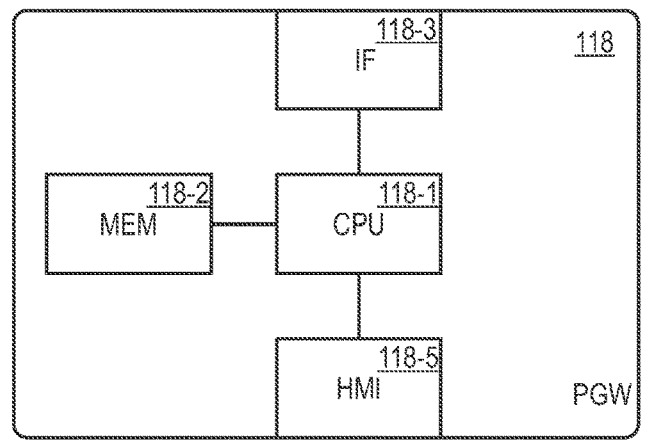
FIG. 11 schematically illustrates the user-plane gateway node of the core of the cellular network configured to establish the end-to-end connection.

FIG. 11 is a schematic illustration of the PGW 118. The PGW 118 comprises a processor 118-1 which is coupled with a memory 118-2. Further, the PGW 118 comprises an interface 118-3 which is configured to receive or send packetized user-plane traffic 251 via the S5 reference point from or to the SGW 117 and via the SGi reference point from and to the access point node 121. Further, the interface 118-3 is configured to send or receive control data to and from the PCRF 119 via the Gx reference point. The PGW 118 further comprises an HMI 118-5 which is configured to receive instructions from a user and output information to a user. The memory 118-2 may store control instructions that can be executed by the processor 118-1. E.g., when the processor 118-1 executes the control instructions, a method according to the flowchart of FIG. 14 may be executed.

Figure 14:
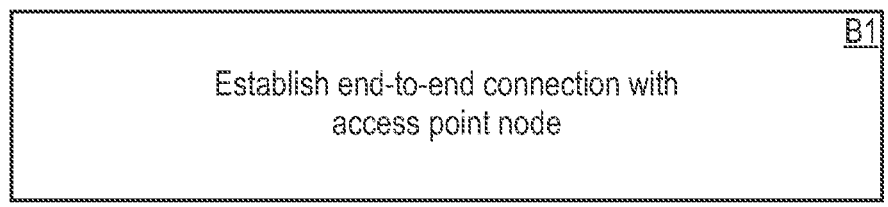
FIG. 14 is a flowchart of a method according to various embodiments, wherein the method comprises establishing the end-to-end connection with the access point node.

Referring to FIG. 14: At B1, the processor 118-1 establishes the end-to-end connection 250. This may include receiving control messages 308, 508 and sending the response messages 309, 509.

While above with respect to FIGS. 11 and 14 various techniques have been illustrated with respect to the PGW 118, it should be understood the corresponding techniques may be readily applied to the SGW 117.

Summarizing, above techniques of establishing an end-to-end connection involving a mobile hotspot have been illustrated. In some scenarios the end-to-end connection is associated with the subscription of the mobile hotspot, i.e., is identified by the IP address of the mobile hotspot, and may be implemented as a dedicated EPS bearer linked to the default EPS bearer of the mobile hotspot. In further scenarios, the end-to-end connection is associated with the subscription of the UE, i.e., is identified by the IP address of the UE; here, the end-to-end connection can be implemented by the default EPS bearer of the UE and/or a dedicated EPS bearer of the UE.

By means of techniques as illustrated above, it is possible that a network operator of the cellular network 110 gains control of the operations of the AP and the traffic to and from the UE attached to the AP. In particular, it can be ensured that policy and charging control functionality is reliably implemented to increase a QoS as experienced by the user and support business aspects of the operator. In particular, policy and charging control functionality can distinguish between traffic associated with the subscriber of the UE and traffic associated with the subscriber of the AP; hence, policy and charging control functionality with respect to the UE may not affect policy and charging control functionality with respect to the AP.

Different UEs may have the same QoS or different QoS for traffic on the respective UE-specific end-to-end connections. Different services may have the same QoS or different QoS for traffic on the respective service-specific end-to-end connections.

By means of techniques as illustrated above, it is possible that the operator aggregates traffic between UEs connected to an AP and the core of the cellular network using the same network backhaul; this allows to use resources on the radio link of the cellular network more efficiently in a scenario where several UEs are arranged in close proximity to each other. In particular, signaling, channel quality measurements, and retransmissions can be implemented more efficiently.

Such techniques of implementing a mobile hotspot as illustrated herein may find various applications. E.g., the trend of integrating 3GPP radio access modules in vehicles such as passenger cars, trains, airplanes, or ships enables the vehicle to provide broadband connectivity to passengers and other devices in the car. According to reference implementations, integrated 3GPP RAT modules act as a mobile hotspot and are limited to providing broadband Internet connectivity to attached UEs. Here, via one or more EPS bearers associated with the IP address of the mobile hotspot, traffic is routed towards the UEs that are identified by local IP addresses.

Comparing the quality of the interface of the mobile hotspot providing the 3GPP RAT with the quality of the interface of the UE providing the 3GPP RAT can yield significant differences. This may be in particular true where the UE is located in an interior of the vehicle. E.g., due to propagation loss by the chassis, the UE typically has to execute transmission on the 3GPP radio link at a comparably higher transmission powers to obtain the same transmission quality as the mobile hotspot which may have access to an antenna arranged outside the vehicle. Further, typically the larger size of the vehicle enables antenna designs having higher efficiency. Therefore, the transmission quality of the mobile hotspot can be superior if compared to the transmission quality of the UE. Further, it is possible to implement advanced multi-input multi-output (MIMO) technology in the vehicle which may further increase the transmission quality.

According to various techniques as illustrated herein, the mobile hotspot of the vehicle may be enhanced in functionality such that the usage of scarce radio resources on the 3GPP radio link can be optimized. Further, it is possible to separate individual traffic via the mobile hotspot on a per-UE basis. Appropriate QoS and charging can be applied selectively to each UE attached to the mobile hotspot—which may not be possible or only possible to a limited degree by mobile hotspots according to reference implementations.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., above scenarios have been discussed where multiple UEs that can be connected to the AP are our subscribers of the same Home Public Land Mobile Network (HPLMN). However, various techniques as illustrated herein can be extended to roaming agreements between different operators.

The invention claimed is:

1. An access point node for use in a cellular communication network having a plurality of base stations, the access point node being different from the plurality of base stations, comprising:
   a first interface configured to communicate with a radio access node of a cellular network via a two-way radio link having transmit and receive capabilities,
   a second interface configured to communicate with a terminal via a further two-way radio link having transmit and receive capabilities, wherein the further two-way radio link includes a radio access technology that is different from a radio access technology of the two-way radio link, and wherein the further two-way radio link comprises a wireless local area network,
   at least one processor configured to receive, via the second interface from the terminal, an attach message,
   wherein the at least one processor is further configured to establish an end-to-end connection with a user-plane gateway node of a core of the cellular network via the first interface, in response to receiving the attach message from the terminal.

2. The access point node of claim 1,
   wherein the end-to-end connection is identified by an IP address of the access point node.

3. The access point node of claim 2,
   wherein the at least one processor is configured to establish a default end-to-end connection with the user-plane gateway node when attaching to the cellular network,
   wherein the at least one processor is configured to receive, via the first interface, the IP address of the access point node as part of said establishing of the default end-to-end connection,
   wherein the default end-to-end connection is identified by the IP address of the access point node.

4. The access point node of claim 3,
   wherein the end-to-end connection is linked to the default end-to-end connection.

5. The access point node of claim 1,
   wherein the at least one processor is configured to assign a local IP address to the terminal,
   wherein the at least one processor is configured to route packetized user-plane traffic on the end-to-end connection based on the local IP address of the terminal.

6. The access point node of claim 1,
   wherein the at least one processor is configured to receive a control message indicating a need of transmission of packetized user-plane traffic of a given service between the cellular network and the terminal, wherein the at least one processor is configured to establish a further end-to-end connection with the user-plane gateway node, wherein the further end-to-end connection is associated with the given service and further identified by an IP address of the access point node.

7. The access point node of claim 6,
wherein the further end-to-end connection is linked or is not linked to the end-to-end connection.

8. The access point node of claim 1,
wherein the second interface is further configured to communicate with another terminal via the further radio link,
wherein the at least one processor is configured to receive, via the second interface from the another terminal, an attach message,
wherein the at least one processor is further configured to establish another end-to-end connection with the user-plane gateway node, in response to receiving the attach message from the another terminal,
wherein the another end-to-end connection is identified by an IP address of the access point node.

9. The access point node of claim 1,
wherein the at least one processor is configured to receive a subscriber identifier from the terminal via the second interface, the subscriber identifier identifying a subscriber of the cellular network associated with the terminal,
wherein the at least one processor is configured to send, via the first interface to the control node of the core of the cellular network, an authorization request message including the subscriber identifier,
wherein the at least one processor is configured to receive, via the first interface, an authorization response message from the control node an authorization response message indicating authorization of the subscriber to communicate on the radio link.

10. The access point node of claim 1,
wherein the at least one processor is configured to send, via the interface to the cellular network, a policy and charging control message including an identifier of the end-to-end connection and further including a subscriber identifier, the subscriber identifier identifying a subscriber associated with the terminal in the cellular network.

11. The access point node of claim 1,
wherein the at least one processor is configured to negotiate with the cellular network, via the first interface, an authorization of the access point node to establish the end-to-end connection.

12. The access point node of claim 11,
wherein the at least one processor is configured to send, via the first interface, a capability request message as part of said negotiating, said capability request message indicating a security level of the access point node.

13. The access point node of claim 1,
wherein the at least one processor is configured to receive, via the first interface from the cellular network, a configuration message including control parameters of said establishing of the end-to-end connection.

14. The access point node of claim 1,
wherein the at least one processor is configured to set a quality of service identifier of the end-to-end connection depending on a type of packetized user-plane traffic on the end-to-end connection between the cellular network and the terminal.

15. The access point node of claim 1,
wherein the at least one processor is configured to route packetized user-plane traffic via the end-to-end connection,
wherein the packetized user-plane traffic is between the terminal and a further access point node of the cellular network establishing a connection to a IP Multimedia Subsystem.

16. A user-plane gateway node of a core of a cellular network that has a plurality of base stations, comprising:
an interface,
at least one processor configured to establish, via the interface with an access point node that is different from the plurality of base stations and is attached to the cellular network via a two-way radio link having transmit and receive capabilities, an end-to-end connection,
wherein the end-to-end connection is identified by an IP address of the access point node,
wherein the at least one processor is further configured to receive, via the interface from the access point node, a policy and charging control message including a subscriber identifier and an identifier of the end-to-end connection, the subscriber identifier identifying a subscriber of the cellular network associated with a terminal connected to the access point node via a further two-way radio link having transmit and receive capabilities, the further two-way radio link includes a radio access technology that is different from a radio access technology of the two-way radio link, and wherein the further two-way radio link comprises a wireless local area network.

17. The user-plane gateway node of claim 16,
wherein the at least one processor is configured to control policy enforcement and charging of packetized user-plane traffic on the end-to-end connection based on the subscriber identifier.

18. A control node of a core of a cellular network that has a plurality of base stations, comprising:
an interface,
at least one processor configured to receive, via the interface from an access point node that is different from the plurality of base stations and is connected to the cellular network via a two-way radio link having transmit and receive capabilities, an authorization request message, the authorization request message including a subscriber identifier identifying a subscriber of the cellular network associated with a terminal connected to the access point node via a further two-way radio link having transmit and receive capabilities, the further two-way radio link includes a radio access technology that is different from a radio access technology of the two-way radio link, and wherein the further two-way radio link comprises a wireless local area network
wherein the at least one processor is configured to check authorization of the subscriber to communicate via the radio link,
wherein the at least one processor is configured to selectively send, via the interface to the access point node, an authorization response message depending on said checking.

19. A method, comprising:
an access point node receiving from a terminal, via a further two-way radio link having transmit and receive capabilities, an attach message, the access point node for use in a cellular communication network having a plurality of base stations, the access point node being different from the plurality of base stations, in response to said receiving of the attach message: establishing an end-to-end connection with a user-plane gateway node of a core of a cellular network via a two-way radio link having transmit and receive capabilities, the further two-way radio link includes a radio access technology that is different from a radio access technology of the two-way radio link, and wherein the further two-way radio link comprises a wireless local area network.

20. The access point node according to claim 1, wherein the attach message is sent in response to the terminal discovering the access point node.

21. The access point node according to claim 1, wherein the attach message is part of an authentication protocol.

22. The access point node according to claim 1, wherein the attach message is sent in response to the terminal coming into transmission range of the access point node.

* * * * *